Patented Apr. 10, 1934

1,954,023

UNITED STATES PATENT OFFICE 1,954,023

MANUFACTURE OF ALIPHATIC KETONES

Horace Finningley Oxley, Walter Henry Groombridge, and Edward Boaden Thomas, Spondon, near Derby, England, assignors to Celanese Corporation of America, a corporation of Delaware No Drawing. Application March 14, 1931, Serial No. 522,774. In Great Britain April 16, 1930

12 Claims. (Cl. 260—134)

This invention relates to the catalytic manufacture of aliphatic ketones and has particular reference to catalysts which are especially suitable for that purpose.

It is known that aliphatic ketones can be produced by subjecting ketonizable bodies, viz acetylene or aliphatic alcohols containing at least two carbon atoms or derivatives of such alcohols (e. g. aldehydes or esters) to reaction with steam in presence of oxides or compounds of heavy metals in admixture with oxygenated compounds of alkali metals. Thus, for instance, it is well known that acetone can be produced by subjecting acetylene or ethyl alcohol or a derivative of ethyl alcohol, such as acetaldehyde or ethyl acetate, to reaction with steam in presence of the said substances.

It has been found in practice, however, that such catalysts are liable to cause difficulties especially owing to their friable nature or their tendency to become friable or weak under the conditions of reaction.

It has now been found that these difficulties can be largely or entirely overcome and that ketones can be produced in a highly satisfactory manner if the reaction is performed in presence of catalysts prepared by first heating or igniting mixtures of alkaline earth metal oxides (or alkaline earth metal compounds capable of yielding oxides on ignition or heating), and one or more weak acidic oxides such as heavy metal oxides (or heavy metal compounds capable of yielding oxides on heating) or silica, to produce a product having hydraulic properties, and thereafter setting the heated or ignited mixture to a "cement" by treatment with water. By the term "hydraulic" we mean the property of setting to a hard "cement" on treatment with water.

The catalysts so produced possess a very high degree of activity coupled with high mechanical strength and resistance to crumbling or disintegration during use.

It has been found that especially useful catalysts can be obtained by first heating or igniting at high temperatures and thereafter setting with water a mixture of calcium oxide (or calcium carbonate or other calcium compound capable of yielding calcium oxide on heating) and an oxide of zinc, iron, aluminium or other heavy metal (or carbonate or other compound capable of yielding the heavy metal oxide on heating) or silica. The said mixture is preferably heated to a very high temperature, such for instance as between 1200 and 1800° C. and particularly 1400–1600° C. While the mixtures of oxides or compounds to be heated can, of course, be produced in any convenient way, preferably the mixtures are formed by co-precipitation of the calcium and heavy metal oxides, carbonates, hydroxides or the like, for instance by precipitation of the hydroxides or carbonates, by treating dilute solutions of calcium salts (e. g. nitrates, chlorides, sulphates) and heavy metal salts (e. g. nitrates, chlorides, sulphates) with caustic soda, soda ash or the like, followed by washing to remove soluble salts and by drying.

It is to be understood that the invention is not limited as to the relative proportions of the calcium oxide and the heavy metal oxide or other acidic oxide, as such proportions may vary considerably. Equimolecular proportions of calcium oxide with zinc oxide, alumina, or other acidic oxide may be employed, with especially satisfactory results. Quantities of the acidic oxides so large as to destroy or substantially destroy the hydraulic properties of the product should, of course, not be employed.

After the mixtures have been heated or ignited the product is, preferably after grinding to a powder, treated or set with sufficient water to produce a "cement".

While especially useful results may be obtained with catalysts of the character referred to and produced with the use of calcium oxide or compounds capable of yielding calcium oxide on heating, other alkaline earth metal oxides capable of yielding hydraulic products (or compounds capable of producing such oxides on heating) may with advantage be employed for producing the catalysts of the invention. For instance, magnesium oxides prepared by igniting magnesium nitrate at a temperature of 500° C. may usefully be employed for the preparation of such catalyst. Thus, for instance, a mixture of magnesium nitrate and the nitrate of a heavy metal, e. g. zinc or aluminum, may be ignited at a temperature of about 500° C. and the resulting product, preferably after grinding to a powder, treated or set with sufficient water to produce a "cement".

The acetylene or alcohol (or derivative thereof) may be caused to react with the steam in presence of the catalysts of the invention in any convenient manner, as for instance by passing a mixture of the acetylene or alcohol (or derivative thereof) and steam over the catalyst heated to the desired temperature, for instance a temperature between 300° and 500° C., and especially a temperature between 350° and 450° C. If desired oxygen or a gaseous mixture containing the same (e. g. air) may be passed together with a mixture of acetylene or alcohol (or derivative thereof) and steam, or for instance oxygen or the like may be passed alternately with the mixture or otherwise intermittently over the catalyst.

Whilst catalysts produced by the method herein described are of particular importance for use in the production of ketones as above described, the same may of course be employed for aiding or catalyzing any other organic reactions which are aided or promoted by the particular elements contained in the said catalysts.

The following example describes the production of a catalyst and the employment thereof in the production of acetone according to the invention, it being understood that the invention is in no way limited thereto.

*Example*

Calcium nitrate and zinc nitrate in equimolecular proportions are dissolved in water to produce a solution having a total concentration of about 10%. The equivalent amount of approximately 20% sodium hydroxide solution is added with stirring to precipitate the calcium and zinc as hydroxides. The precipitate is washed by alternate decantation and filtration until the alkali salt concentration is less than .1%. The precipitate is then drained, dried in cakes at about 80° C. and then heated in a furnace in an oxidizing atmosphere, the temperature being raised to 1450 to 1500° C. and maintained thereat for an hour. The product, after cooling, is ground to a powder e. g. a powder which will pass an 80 mesh sieve, and immediately slaked in small quantities, using just sufficient water to give a plastic mass before setting, which setting occurs within about half an hour.

After standing for about 24 hours the cakes are broken down to a suitable size, e. g. ⅛ to ⅜ mesh, and the catalyst so produced is charged into the reaction vessel, such for instance as a heated tube.

Steam and ethyl alcohol, in the proportion 3 volumes of steam to 2 volumes of alcohol, are passed in contact with the catalyst at a temperature of between about 465 and 480° C. and the gases or vapours leaving the reaction vessel treated in any convenient way, e. g. condensation and/or scrubbing to recover the acetone produced. The product may be further treated to obtain the acetone in as pure a form as possible (e. g. by fractionation).

By this means a high yield of acetone, e. g. 60 to 70% of the theoretical yield, is readily obtained.

Because of the great mechanical strength of the catalyst the same shows little tendency to become friable or weak under the conditions obtaining in the reaction vessel.

What we claim and desire to secure by Letters Patent is:—

1. The manufacture of an aliphatic ketone comprising subjecting a body selected from the group of oxygen-containing ketonizable bodies consisting of alcohols containing at least two carbon atoms, aldehydes and esters of such alcohols, to reaction with steam in presence of a hard cement produced by heating a mixture of an oxide of an alkaline earth metal and an oxide of weak acidic nature to produce a product having hydraulic properties and setting the product to a cement by treatment with water.

2. The manufacture of an aliphatic ketone comprising subjecting a body selected from the group of oxygen-containing ketonizable bodies consisting of alcohols containing at least two carbon atoms, aldehydes and esters of such alcohols, to reaction with steam in presence of a hard cement produced by heating in an oxidizing atmosphere a mixture of an oxide of an alkaline earth metal and an oxide of weak acidic nature to produce a product having hydraulic properties and setting the product to a cement by treatment with water.

3. The manufacture of an aliphatic ketone comprising subjecting a body selected from the group of oxygen-containing ketonizable bodies consisting of alcohols containing at least two carbon atoms, aldehydes and esters of such alcohols, to reaction with steam in presence of a hard cement produced by heating to temperatures between 1200 and 1800° C. a mixture of an oxide of an alkaline earth metal and an oxide of weak acidic nature to produce a product having hydraulic properties and setting the product to a cement by treatment with water.

4. The manufacture of an aliphatic ketone comprising subjecting a body selected from the group of oxygen-containing ketonizable bodies consisting of alcohols containing at least two carbon atoms, aldehydes and esters of such alcohols, to reaction with steam in presence of a hard cement produced by heating to temperatures between 1200 and 1800° C. for a period of one hour a mixture of an oxide of an alkaline earth metal and an oxide of weak acidic nature to produce a product having hydraulic properties and setting the product to a cement by treatment with water.

5. The manufacture of an aliphatic ketone comprising subjecting a body selected from the group of oxygen-containing ketonizable bodies consisting of alcohols containing at least two carbon atoms, aldehydes and esters of such alcohols, to reaction with steam in presence of a hard cement produced by heating in an oxidizing atmosphere to temperatures between 1200 and 1800° C. for a period of one hour a mixture of an oxide of an alkaline earth metal and an oxide of weak acidic nature to produce a product having hydraulic properties and setting the product to a cement by treatment with water.

6. The manufacture of acetone comprising subjecting a body selected from the group of oxygen-containing ketonizable bodies consisting of ethyl alcohol, acetaldehyde, and esters of ethyl alcohol, to reaction with steam in presence of a hard cement produced by heating a mixture of an oxide of an alkaline earth metal and an oxide of weak acidic nature to produce a product having hydraulic properties and setting the product to a cement by treatment with water.

7. The manufacture of acetone comprising subjecting a body selected from the group of oxygen-containing ketonizable bodies consisting of ethyl alcohol, acetaldehyde, and esters of ethyl alcohol, to reaction with steam in presence of a hard cement produced by heating in an oxidizing atmosphere to temperatures between 1200 and 1800° C. for a period of one hour a mixture of an oxide of an alkaline earth metal and an oxide of weak acidic nature to produce a product having hydraulic properties and setting the product to a cement by treatment with water.

8. The manufacture of an aliphatic ketone comprising subjecting a body selected from the group of ketonizable bodies consisting of acetylene, alcohols containing at least two carbon atoms, aldehydes and esters of such alcohols, to reaction with steam in presence of a hard cement produced by treatment with water of a product having hydraulic properties consisting essentially of zinc and at least one alkaline earth metal in the form of oxygen-containing compounds.

9. The manufacture of an aliphatic ketone comprising subjecting a body selected from the group of ketonizable bodies consisting of acetylene, alcohols containing at least two carbon atoms, aldehydes and esters of such alcohols, to reaction with steam in presence of a hard cement produced by treatment with water of a product having hydraulic properties consisting essentially of zinc and calcium in the form of oxygen-containing compounds.

10. The manufacture of acetone comprising subjecting a body selected from the group of ketonizable bodies consisting of acetylene, ethyl alcohol, acetaldehyde and esters of ethyl alcohol, to reaction with steam in presence of a hard cement produced by treatment with water of a product having hydraulic properties consisting essentially of zinc and at least one alkaline earth metal in the form of oxygen-containing compounds.

11. The manufacture of acetone comprising subjecting a body selected from the group of ketonizable bodies consisting of acetylene, ethyl alcohol, acetaldehyde and esters of ethyl alcohol, to reaction with steam in presence of a hard cement produced by treatment with water of a product having hydraulic properties consisting essentially of zinc and calcium in the form of oxygen-containing compounds.

12. The manufacture of acetone comprising subjecting ethyl alcohol to reaction with steam at temperatures between 300 and 500° C. in presence of a hard cement produced by treatment with water of a product having hydraulic properties consisting essentially of zinc and calcium in the form of oxygen-containing compounds.

HORACE FINNINGLEY OXLEY.
WALTER HENRY GROOMBRIDGE.
EDWARD BOADEN THOMAS.